United States Patent [19]

Nitzsche et al.

[11] 3,877,956

[45] Apr. 15, 1975

[54] STABILIZATION OF AQUEOUS SOLUTIONS FROM HYDROLYZABLE ORGANOSILANES

[75] Inventors: Siegfried Nitzsche; Ewald Pirson; Michael Roth, all of Burghausen, Germany

[73] Assignee: Wacker-Chemie GmbH, Munich, Germany

[22] Filed: July 24, 1972

[21] Appl. No.: 274,390

[30] Foreign Application Priority Data
July 22, 1971 Germany.............................. 2136745

[52] U.S. Cl. ............................... 106/287 SB; 106/2
[51] Int. Cl................................................ C09k 3/00
[58] Field of Search ......................... 260/2, 448.2 R; 106/287 SE, 287 SB

[56] References Cited
UNITED STATES PATENTS

| | | | |
|---|---|---|---|
| 2,803,610 | 8/1957 | Kress............................... | 106/287 SB |
| 3,392,130 | 7/1968 | Rucker et al. ........................ | 106/14 |

*Primary Examiner*—Lewis T. Jacobs

[57] ABSTRACT

Use of carboxylic acids to stabilize aqueous solutions prepared from hydrolyzable organosilanes in which the hydrolyzable groups are derived predominantly from polyvalent alcohols.

7 Claims, No Drawings

STABILIZATION OF AQUEOUS SOLUTIONS FROM HYDROLYZABLE ORGANOSILANES

The invention relates to stabilized aqueous solutions and more particularly to stabilized aqueous solutions obtained from hydrolyzable organosilanes.

Water-soluble, hydrolyzable organosilanes in which the hydrolyzable groups are at least predominantly derived from polyvalent alcohols are well known in the art. These silanes are useful as water-repellent agents for building materials (See German Pat. No. 1,069,057 and U.S. Pat. No. 2,906,768). These water-soluble organo-silicon compounds offer the advantage that they can be used in the form of aqueous solutions in the absence of emulsifiers or dissolving agents such as alcohols. However, these solutions are stable for only about 24 hours when tap water is used as a dissolving agent and up to about 90 hours when distilled water is used as a solvent (See German Pat. No. 1,069,057). A stability period of 24 hours or less is unsatisfactory and under many conditions distilled water can be obtained only with difficulty, particularly in the building industry.

Therefore it is an object of this invention to provide a stable aqueous silicone composition. Another object of this invention is to provide a stable aqueous solution which is obtained from hydrolyzable silanes. A further object of this invention is to provide a stable water repellent composition which is obtained from hydrolyzable silanes in which the hydrolyzable groups are derived predominantly from polyvalent alcohols.

The foregoing objects and others which will become apparent in the following description are accomplished in accordance with this invention, generally speaking, by adding monocarboxylic acids to aqueous solutions prepared from water-soluble hydrolyzable organosilanes in which the hydrolyzable groups are derived predominantly from polyvalent alcohols.

It is known that acidic substances promote the hydrolysis of silanes containing hydrolyzable groups which are derived from polyvalent alcohols (See German Pat. 1,069,057). In the hydrolysis, monomeric organo-silicon compounds having Si-bonded hydroxyl groups are first formed which then polymerize to form water insoluble organopolysiloxanes. Thus, it is surprising that aqueous solutions of hydrolyzable silanes, especially silanes having hydrolyzable groups derived predominantly from polyvalent alcohols, could be stabilized by the addition of certain acidic compounds.

Since it is extremely difficult or even impossible to determine in which form the organo-silicon compounds are present in the aqueous solutions, i.e., whether they are present as silanes or possibly in the form of partially condensed hydrolyzates thereof, the expressions "from water-soluble, hydrolyzable alkyl silanes are prepared as aqueous solutions" or "aqueous solutions, prepared from water-soluble hydrolyzable alkyl silanes" are used to describe the instant invention.

Acids which may be used as stabilizers for the aqueous solutions are monocarboxylic acids having from 2 to 6 carbons and more preferably having from 2 to 4 carbon atoms. Examples of suitable acids are acetic acid, propionic acid, butyric acid, valeric acid and caprioic acid.

The amount of acid employed is not critical, however, sufficient acid should be present to stabilize the composition. Generally, the amount may vary from about 0.05 to 10 weight percent and more preferably from about 0.5 to about 2.0 weight percent based on the weight of the silane.

In preparing the aqueous solutions of this invention, generally from 2.5 to 30 weight percent and more preferably from 3 to 20 weight percent of organosilane per 100 parts of water are used. However, more or less may be used without deviating from this invention.

The organosilanes used in this invention may be represented by the general formula

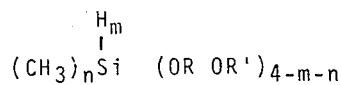

in which R is a divalent hydrocarbon radical having from 1 to 6 carbon atoms or a divalent hydrocarbonoxy radical in which the oxygen is in the form of an ether linkage, R' is hydrogen or monovalent hydrocarbon radicals having up to 6 carbon atoms or acyl radicals having the formulae

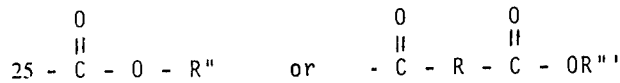

where R may be the same as R above, R'' is a monovalent hydrocarbon radical having up to 6 carbon atoms and R''' may be the same as R'', or hydrogen or a salt-forming cation such as ammonia or sodium, $m$ is a number of from 0 to 1 and $n$ is a number of from 1 to 2.

Specific examples of radicals represented by R are ethylene, propylene, tetramethylene, pentamethylene, hexamethylene and corresponding hydrocarbonoxy radicals having an oxygen in the form of an ether linkage. Examples of radicals represented by R'' are alkyl radicals such as methyl, ethyl, propyl, butyl, amyl, hexyl and the like.

The organosilanes may be prepared in accordance with the procedure described in U.S. Pat. No. 2,906,768, in which a polyvalent alcohol or diol of the formula HO R OR' is reacted with a halosilane of the formula

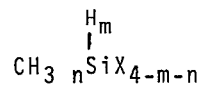

under subatmospheric pressure, wherein X is halogen and R, R' and $m$ and $n$ are the same as defined above.

As mentioned heretofore, the polyvalent alcohols employed in the preparation of the hydrolyzable organosilanes used in this invention may also contain an acyl radical having from 1 to 6 carbon atoms of the formula

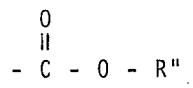

or a radical of the formula

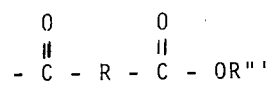

where R, R'' and R''' are the same as above. The group represented by R'' and R''' should not result in substantial reduction of the silane's water-solubility. Preferably such groups will not be present, since they reduce the accessibility of the polyvalent alcohols and reduce the concentration of the water repellent group ( SiO— ) in each silane molecule.

Specific examples of diols which may be employed are ethylene glycol, propylene glycol, butylene glycol, 2 hexanediol, 1,6-hexanediol and polyglycols containing ether linkages such as diethylene glycol, triethylene glycol, octaethylene glycol and the like.

Examples of suitable water soluble silanes which may be used in this invention are methyltris (beta-hydroxyethoxy)-silane, [CH$_3$Si (OCH$_2$CH$_2$OH)$_3$], and silanes which correspond to the general formula (CH$_3$)$_n$H$_m$Si[ OC$_2$H$_4$)$_x$OR ]$_{4-m-n}$ where $x$ is a number of from 1 to 10, e.g., methyltris (beta-methoxyethoxy)-silane. Other silanes, such as those represented by the following general formulae

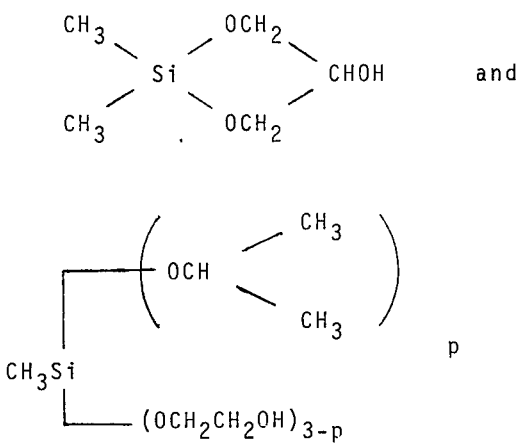

where P = 0,1 or 2, but on the average contain less than .5 hydro-oxy-ether groups per Si-atom may also be used in this invention. However, the preferred silane is methyl tris (beta-hydroxyethoxy)-silane because of its availability, its solubility and its high content of water repellent group.

Solutions which have been stabilized according to the invention can be used wherever the application of aqueous solutions prepared from hydrolyzable silanes is desired. The most important of these applications is probably in creating water repellance in construction materials or stonework such as natural stone, bricks, mortar, concrete, asbestos, gypsum and roofing tiles. When the building materials consist of inorganic substances, such as cement or gypsum, then the solutions stabilized according to the invention can either be applied on the surface of the hardened materials or be combined with such materials before they are mixed with the water used to harden the same. Also these stabilized solutions may be used in rendering organic materials, such as wood or textiles, water-repellent; the production of castings from the solutions and suitable reinforcing agents, such as micaceous flakes, asbestos or glass-fibers, the impregnation of glass fibers in order to avoid the adherence of organic resins to the glass surface and as release agents.

The embodiments of this invention are further illustrated by the following examples in which all parts are by weight unless otherwise specified.

EXAMPLE 1

About 50 parts of methyltris (beta-hydroxyethoxy)-silane or methyltris (beta-methoxyethoxy)-silane are first mixed with 0.25 part of the below-listed carboxylic acids and then with about 450 parts of water. For purposes of comparison, 50 parts of methyltris (beta-hydroxyethoxy)-silane or methyltris (beta-methoxyethoxy)-silane are mixed with 450 parts of water in the absence of the acids. The water used for the example came from a river. After preparing these samples, the period of time that elapses until the naked eye can observe that the thus obtained solution has become opaque is determined. The following results are obtained:

TABLE 1

| Silane | Carboxylic Acids | Elapsed hours to Opacity |
|---|---|---|
| CH$_3$Si(OCH$_2$CH$_2$OH)$_3$ | Acetic acid | 162 |
| CH$_3$Si(OCH$_2$CH$_2$OH)$_3$ | Propionic acid | 280 |
| CH$_3$Si(OCH$_2$CH$_2$OH)$_3$ | — | 1 |
| CH$_3$Si(OCH$_2$CH$_2$OCH$_3$)$_3$ | Acetic acid | 311 |
| CH$_3$Si(OCH$_2$CH$_2$OCH$_3$)$_3$ | Propionic acid | 456 |
| CH$_3$Si(OCH$_2$CH$_2$OCH$_3$)$_3$ | — | 9 |

EXAMPLE 2

About 50 parts of methyltris-(beta-hydroxyethoxy)-silane or methyltris-(beta-methoxyethoxy)-silane are first mixed with acetic acid to the extent indicated below and then with about 450 parts of water. The period of time that elapses until the naked eye can observe that the solution has become opaque is determined. The following results are obtained:

TABLE 2

| Silane | Carboxylic Acid in Parts | Elapsed time to opacity |
|---|---|---|
| CH$_3$Si(OCH$_2$CH$_2$OH)$_3$ | 1.5 | 113 |
| CH$_3$Si(OCH$_2$CH$_2$OH)$_3$ | 4.5 | 40 |
| CH$_3$Si(OCH$_2$CH$_2$OCH$_3$)$_3$ | 1.5 | 192 |
| CH$_3$Si(OCH$_2$CH$_2$OCH$_3$)$_3$ | 4.5 | 91 |

EXAMPLE 3

About 50 parts of methyltris-(beta-hydroxyethoxy)-silane or methyltris-(beta-methoxyethoxy)-silane are first mixed with about 0.25 part of propionic acid and then with about 450 parts of water. For purposes of comparison, 50 parts of methyl-(beta-hydroxyethoxy) silane are methyltris(beta-methoxyethoxy)-silane are mixed with about 450 parts of water in the absence of carboxylic acid. In order to determine the effectiveness of the thus obtained solution after more than 90 hours have elapsed, three gypsum discs are inserted in the solution after 6 days. The gypsum discs have a diameter of 10 cm and a thickness of 2 cm. The discs are immersed in the solution for 30 seconds and are then allowed to dry for 6 days. Thereafter these thus-treated gypsum discs as well as untreated gypsum discs are weighed, immersed for 90 minutes in water at a depth of 50 mm below the water's surface, and the discs are then weighed after a 90 minute drying period. The following average water absorption results are obtained:

TABLE 3

| Silane | Additive | Water absorption in wt. percent |
|---|---|---|
| $CH_3(OCH_2CH_2OH)_3$ | Propionic acid | 1.1 |
| $CH_3(OCH_2CH_2OH)_3$ | none | 34.5 |
| $CH_3(OCH_2CH_2OCH_3)_3$ | Propionic acid | 1.3 |
| $CH_3(OCH_2CH_2OCH_3)_3$ | none | 28.7 |
| $CH_3(OCH_2CH_2OCH_3)_3$ | — | 34.55 |

Although specific examples of the invention have been described herein, it is not intended to limit the invention solely thereto, but to include all variations and modifications falling within the spirit and scope of the appended claims.

What is claimed is:

1. An aqueous solution obtained from a water soluble hydrolyzable organosilane selected from the class consisting of silanes of the formula

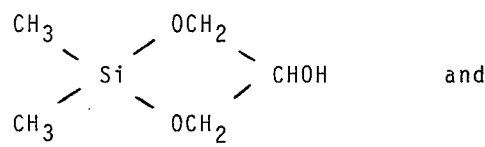

and

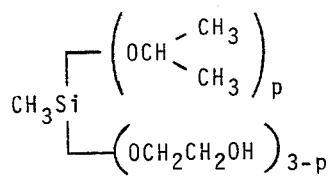

wherein R is selected from the groups consisting of divalent hydrocarbon radicals and divalent hydrocarbonoxy radicals, R' is selected from the group consisting of hydrogen, monovalent hydrocarbon radicals having from 1 to 6 carbons atoms,

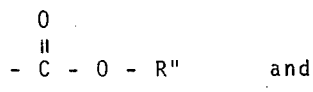

and

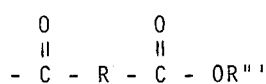

where R'' is a monovalent hydrocarbon radical having from 1 to 6 carbon atoms, R''' is selected from the group consisting of R'', hydrogen and a salt-forming cation, P is equal to 0.1 to 2, n is 1 or 2 and m is 0 or 1, and from about 0.05 to about 10 percent by weight based on the weight of the silane of a monocarboxylic acid having from 2 to 6 carbon atoms.

2. The composition of claim 1 wherein the monocarboxylic acid is acetic acid.

3. The composition of claim 1 wherein the monocarboxylic acid is propionic acid.

4. The composition of claim 1 wherein the salt forming cation is selected from the group consisting of ammonia and sodium.

5. The composition of claim 4 wherein the hydrolyzable organosilane is methyltris(beta-hydroxyethoxy)silane.

6. A method for stabilizing an aqueous solution obtained from a water-soluble hydrolyzable methyl silane selected from the class consisting of silanes of the formula

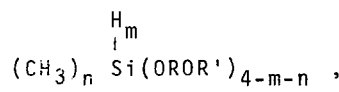

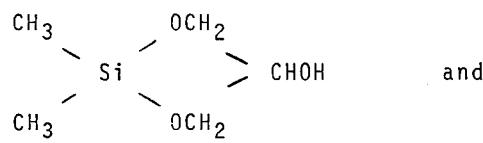

and

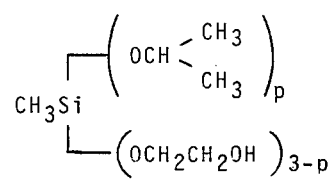

wherein R is selected from the groups consisting of divalent hydrocarbon radicals and divalent hydrocarbonoxy radicals, R' is selected from the group consisting of hydrogen, monovalent hydrocarbon radicals having from 1 to 6 carbon atoms,

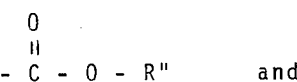

and

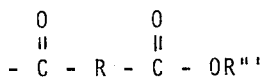

where R'' is a monovalent hydrocarbon radical having from 1 to 6 carbon atoms, R''' is selected from the groups consisting of R'', hydrogen and a salt-forming cation, P is equal to 0.1 or 2, n is 1 or 2 and m is 0 or 1, which comprises adding from 0.05 to 10 percent by weight based on the weight of the silane of a monocarboxylic acid having from 2 to 6 carbon atoms to said aqueous solution.

7. The process of claim 6 wherein the silane is methyltris(beta-hydroxyethoxy)-silane.

* * * * *